(12) United States Patent
Videnovic (10) Patent No.: US 11,776,074 B2
(45) Date of Patent: Oct. 3, 2023

(54) TABLEBOT

(71) Applicant: Aleksandar Videnovic, Chicago, IL (US)

(72) Inventor: Aleksandar Videnovic, Chicago, IL (US)

( * ) Notice: Subject to any disclaimer, the term of this patent is extended or adjusted under 35 U.S.C. 154(b) by 19 days.

(21) Appl. No.: 16/933,083

(22) Filed: Jul. 20, 2020

(65) Prior Publication Data

US 2020/0380622 A1 Dec. 3, 2020

Related U.S. Application Data

(62) Division of application No. 15/956,230, filed on Apr. 18, 2018, now abandoned.

(60) Provisional application No. 62/602,489, filed on Apr. 24, 2017.

(51) Int. Cl.
| | |
|---|---|
| *G06Q 50/12* | (2012.01) |
| *G06Q 20/20* | (2012.01) |
| *G06Q 30/02* | (2023.01) |
| *H04W 4/80* | (2018.01) |
| *H04W 4/14* | (2009.01) |

(52) U.S. Cl.
CPC ........... *G06Q 50/12* (2013.01); *G06Q 20/202* (2013.01); *G06Q 20/204* (2013.01); *G06Q 20/209* (2013.01); *G06Q 30/0281* (2013.01); *H04W 4/14* (2013.01); *H04W 4/80* (2018.02)

(58) Field of Classification Search
CPC ........ G06Q 10/00; G06Q 20/00; G06Q 30/00; G06Q 40/00; G06Q 50/00; G06Q 90/00; G06Q 99/00; G06Q 2220/00; G06Q 2230/00; G06Q 2240/00; G06Q 2250/00
See application file for complete search history.

(56) References Cited

U.S. PATENT DOCUMENTS

| | | | |
|---|---|---|---|
| 9,578,120 B1 | 2/2017 | Evenson | |
| 9,911,165 B2 * | 3/2018 | Firminger | G16H 40/20 |
| 10,760,783 B2 * | 9/2020 | Reynolds | F21V 23/005 |
| 2003/0078793 A1 * | 4/2003 | Toth | G06Q 50/12 |
| | | | 705/15 |
| 2004/0217877 A1 * | 11/2004 | Kokonaski | A47L 23/22 |
| | | | 340/815.4 |
| 2005/0178074 A1 * | 8/2005 | Kerosetz | A47F 9/02 |
| | | | 52/36.1 |
| 2007/0051024 A1 * | 3/2007 | Fuchs | G09F 15/0025 |
| | | | 40/610 |
| 2007/0106568 A1 | 5/2007 | Asher et al. | |
| 2007/0130017 A1 * | 6/2007 | Torres | G06Q 50/12 |
| | | | 705/15 |
| 2013/0191174 A1 * | 7/2013 | Zhou | G06Q 30/0641 |
| | | | 705/5 |
| 2014/0365251 A1 * | 12/2014 | Tejima | G06Q 10/06 |
| | | | 705/5 |
| 2015/0046320 A1 | 2/2015 | Baldwin | |
| 2016/0071224 A1 * | 3/2016 | Huang | G06Q 20/322 |
| | | | 705/15 |
| 2016/0275576 A1 * | 9/2016 | Logan | H04W 4/33 |
| 2016/0350818 A1 * | 12/2016 | Saeed | G06Q 30/0282 |
| 2017/0046800 A1 * | 2/2017 | Zomet | G06Q 50/12 |

(Continued)

*Primary Examiner* — Peter Ludwig
(74) *Attorney, Agent, or Firm* — Banner & Witcoff, Ltd.

(57) ABSTRACT

This patent application is intended to protect an electronic tabletop device that communicates messages/requests via text to a smartwatch that is worn by a server/bartender in order to satisfy a patron's request.

8 Claims, 7 Drawing Sheets

(56) References Cited

U.S. PATENT DOCUMENTS

2017/0228129 A1* 8/2017 Shen .................... G06F 3/0482
2021/0174461 A1* 6/2021 Potter ................... G06Q 50/12

* cited by examiner

MESSAGE BAR
LED LIGHT
BUTTONS

CHARGING TRAY

FIG. 7

TABLEBOT

BACKGROUND

This application is a Divisional application to U.S. Ser. No. 15/956,230, filed Apr. 18, 2018, which claims priority to Provisional application No. 62/602,489, filed Apr. 24, 2017.

This is my non-provisional patent submission for my invention called Tablebot. It's a device that's designed to improve efficiency in reservation taking restaurants & lounges. Tablebot is a Bluetooth/Wi-Fi Based Wireless Control System. Tablebot would integrate an end-to-end restaurant management system. It would also be integrated with whatever system the restaurant/lounge uses with its point of sale system, or act as one. It would be a rechargeable device.

SUMMARY

The following summary presents a simplified summary of certain features. The summary is not an extensive overview and is not intended to identify key or critical elements.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

The accompanying drawings, which form a part hereof, show examples of the disclosure. It is to be understood that the examples shown in the drawings and/or discussed herein are non-exclusive and that there are other examples of how the disclosure may be practiced.

Figure 1:
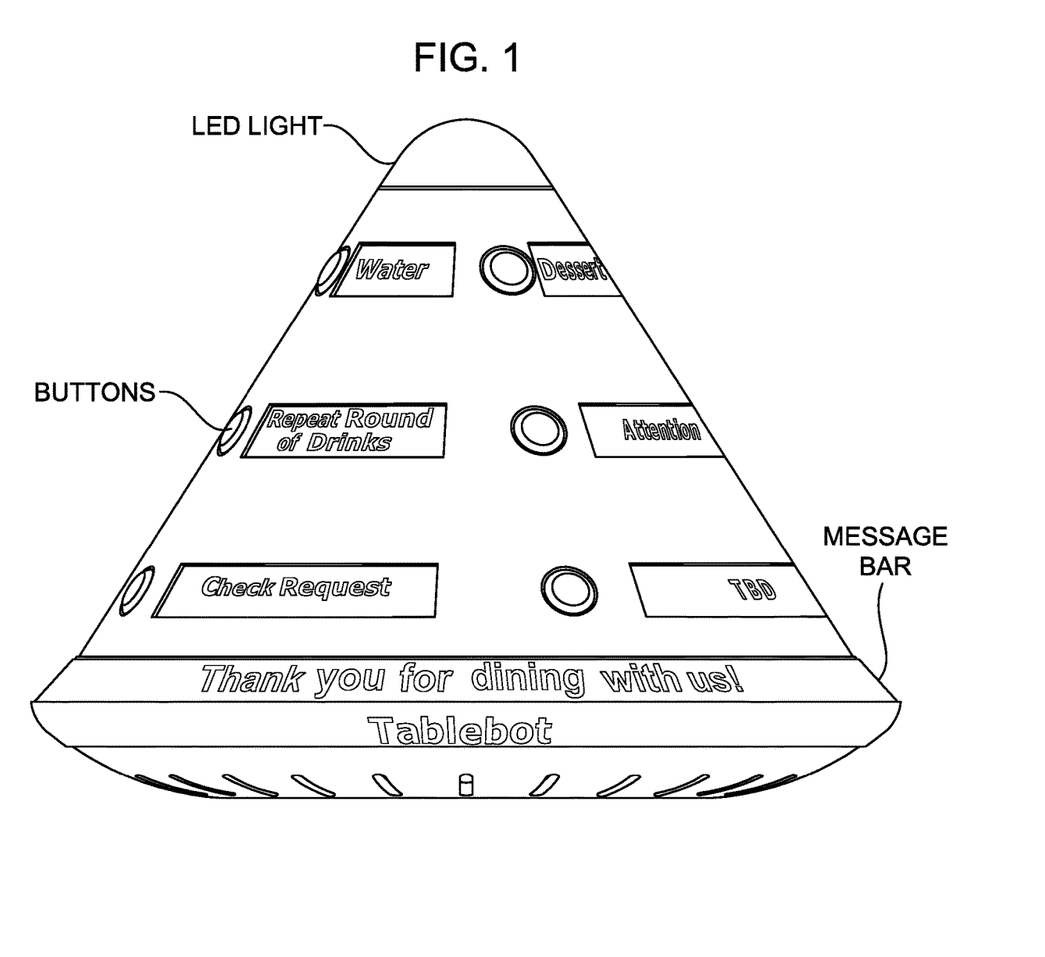
FIG. 1 is the front side button view of the Tablebot device.
Figure 2:
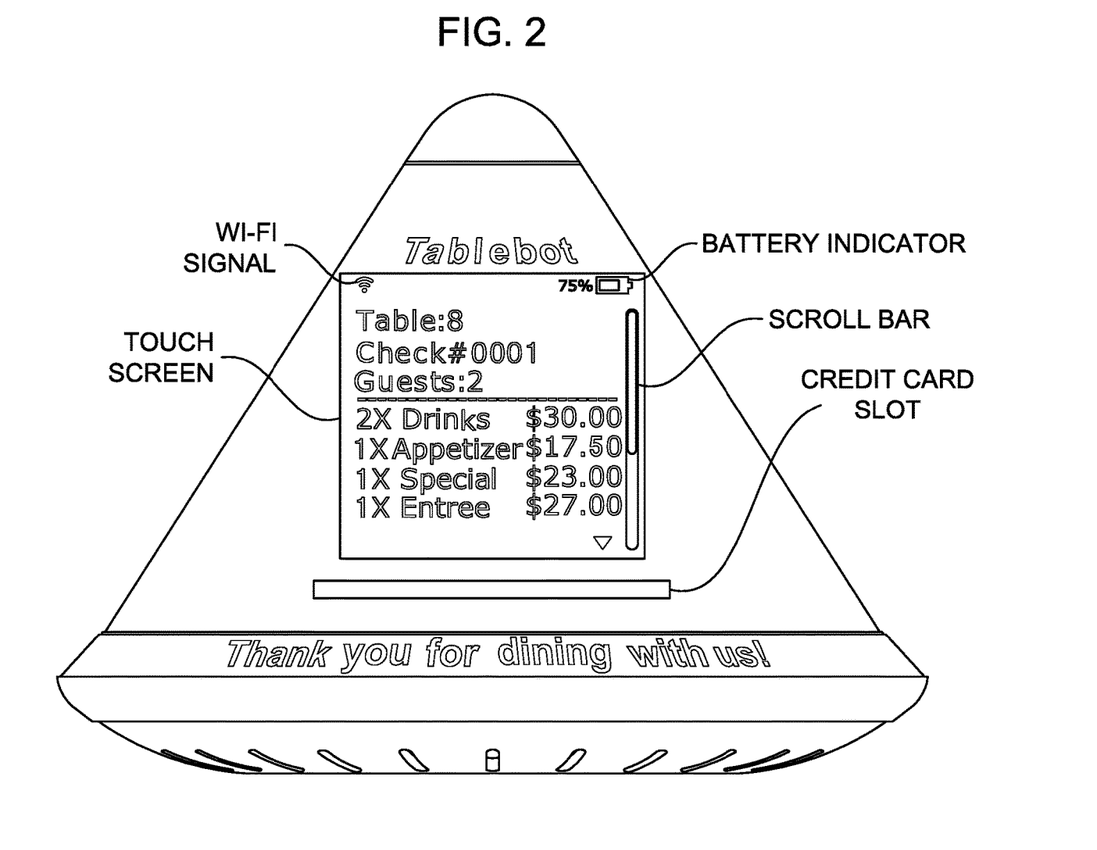
FIG. 2 is the backside screen view of the Tablebot device.
Figure 3:
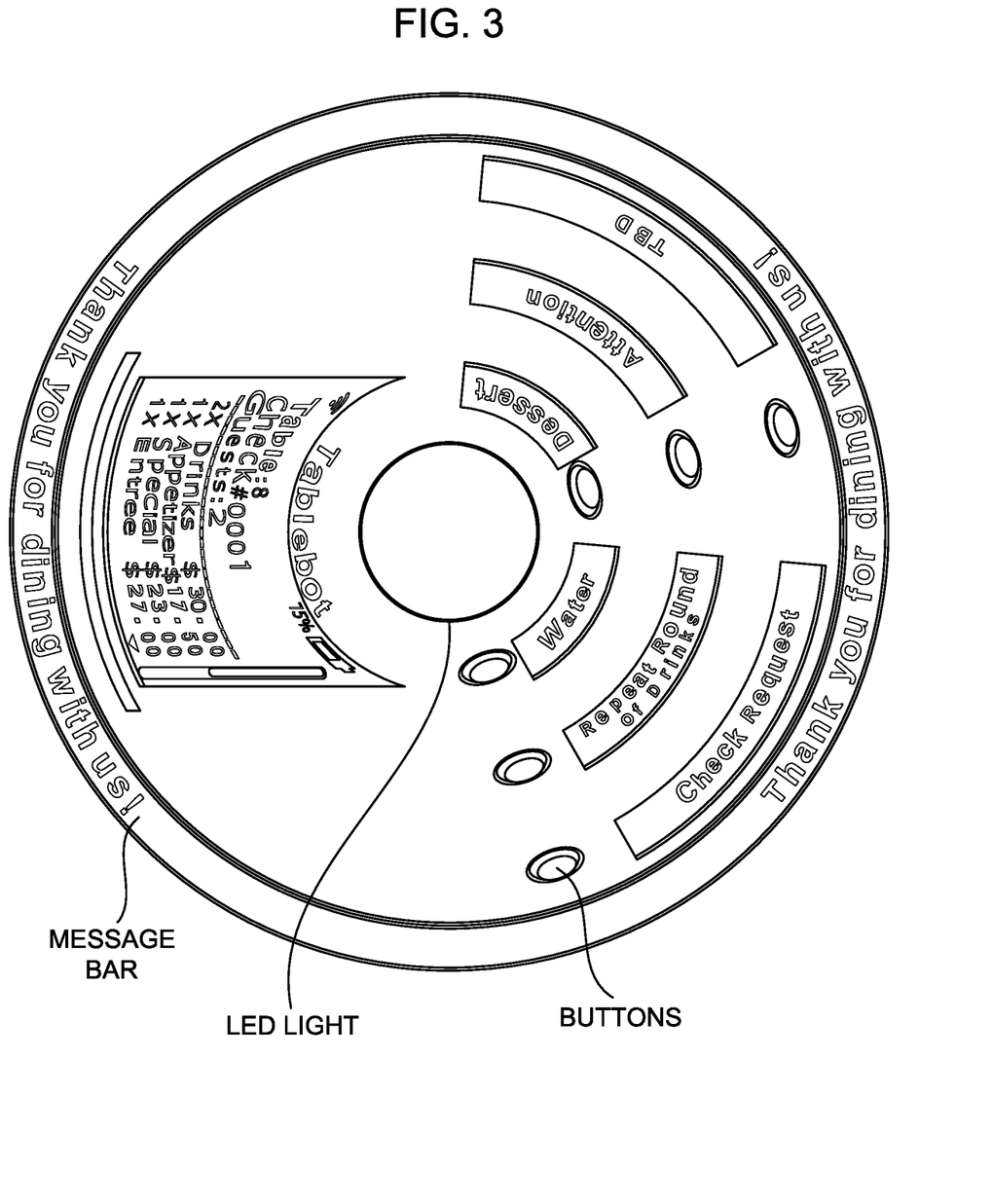
FIG. 3 is the top view of the Tablebot device.
Figure 4:
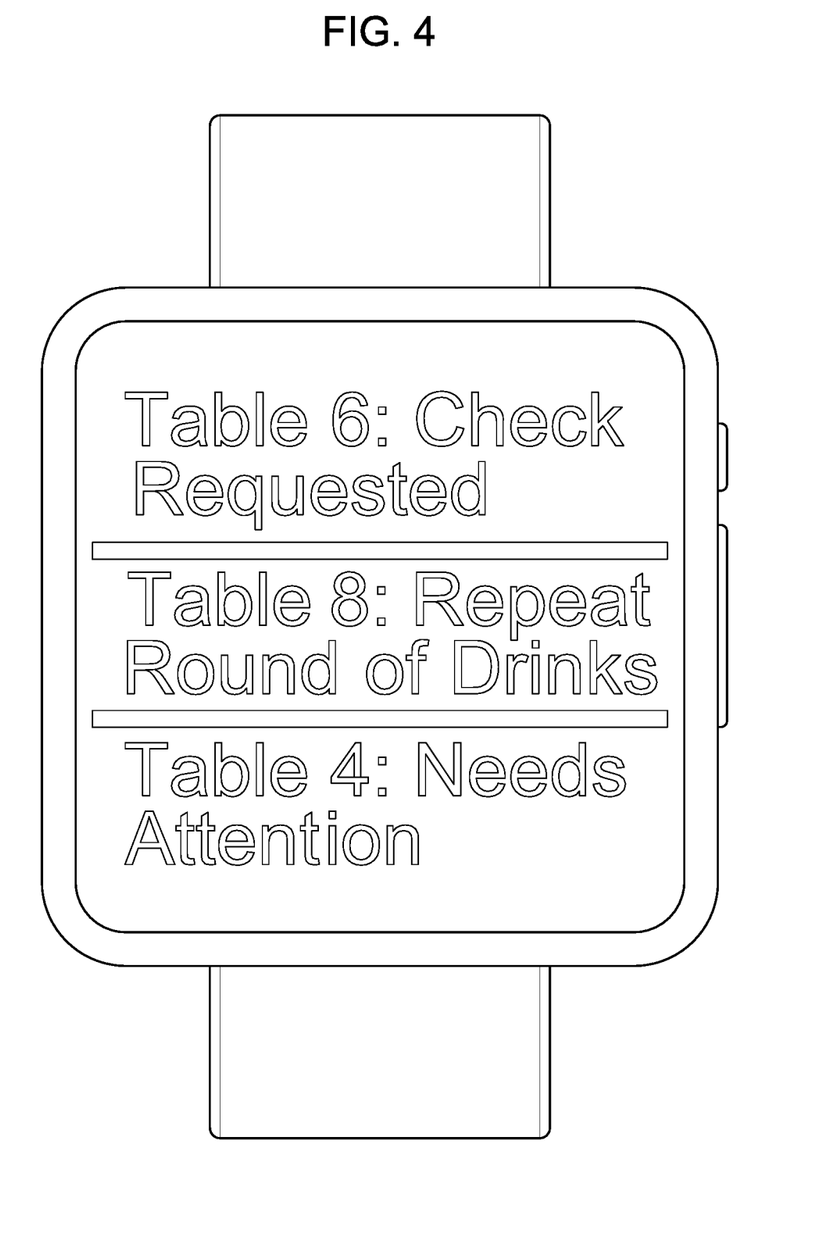
FIG. 4 is the front view of the smartwatch that works with the Tablebot device.

Tablebot is designed to look like a small space capsule (FIG. 1, 2, 3, 7). Tablebot would have a bendable/flexible touch screen display with scrolling capability similar to an iPhone, along with a credit card slot/chip reader located below the touch screen (FIG. 2, 7). The chip reader would be compatible with all major US credit cards (examples- Visa, Master Card, American Express, Discover). Tablebot would also be compatible with Apple Pay, Sam-sung Pay & Android Pay. The device would be designed with several reprogrammable bendable/flexible touch screen buttons on it (FIG. 1, 3, 7). The buttons would be used to make requests from a table by sending an sms (text) to a smartwatch that's worn by the server (FIG. 4). If a server already happens to own his/her own smartwatch, then they would just download the app (which would be created by Tablebot) that enables them to use their own watch instead of the one provided by Tablebot. Tablebot would be compatible for iOS and Android smartwatches. It would also be compatible with a restaurant tablet system in addition to the smartwatch. The Tablebot device would be placed in the center of a dining room/lounge table. The top/tip of the device would have an LED light that would have the ability to change to several color options (FIG. 1, 2, 3, 7). When lit, the light would enable the wait staff to easily notice which tables in their section need attention. The administrator would control the lights color and brightness. For example, when it's Valentine's Day the light could be set to red. For fall holidays like Halloween or Thanksgiving it could be set to autumn type colors such as orange or yellow. For Christ-mas it could be set to green and red simultaneously. When celebrating cancer awareness month it could be set to pink. The light can also be set to a cities sports team's colors, similar to how cities light up their skylines to show support when their teams are doing well. The light would also be able to mimic a burning candle. Regardless of what color is selected the device would default to white every time a request is put in. Tablebot would assist the wait staff by notifying them in the proper order that requests are made so that tables aren't being overlooked or serviced out of order. Once a request is put in, the top/tip of the device would light up indicating the request.

Simultaneously the smartwatch being worn by the server vibrates or chirps specifying the same request made by the party. Once the server tends to the table he/she deletes the request from the watch, and the light on the device would turn off. So instead of having to get the servers attention to come to the table, the request can instantly be sent to the server's smartwatch to save time. The smartwatch would show the table number and what the request is (FIG. 4). Example 1: A button on the device would be labeled "Repeat Round". Anytime this button is selected the drink order automatically notifies the server and the bartender simultaneously. The button would notify the server that the party would like to refresh their round of drinks and it would also be forwarded to the bartender notifying him/her to make the drinks so they are ready for the server to take to the table, instead of having the server walk over to the table to take the drink order. Example 2: Another button would be labeled "Water". This would notify the server that the party is in need of water so he/she can notify the bus boy to tend to the table instead of having them wander the room aimlessly to see which tables need water. The bus crew would be more efficient clearing tables this way as well. Example 3: Another button would be labeled "Dessert" indicating that the party would like to see the dessert menu, or have the server tell them about the desserts offered. Example 4: Another button would simply be labeled "Attention". This button is to get the servers attention for other requests the diners/patrons may have instead of having to waive him/her down, or wait for the server to come to the table on his/her own. Example 5: Another button would be labeled "Check Request". This would alert the server that the party has requested the check. Once that button is pressed the party has the option to view the check on the Tablebot device screen. The party can then specify on the screen whether they want to pay with credit card or request a paper check. If a paper check is requested, it notifies the server so he/she can print it and bring it to the table. If the party would rather have the server handle the credit card that can also be requested. The pay with credit card feature using the Tablebot device is intended to enable the customer(s) to pay without requesting the server. If a party chooses to pay without the assistance of the server by using a credit card it can be done by following the instructions on the device and inserting a credit card, or cards (one at a time if splitting the bill).

Items can be split up appropriately upon check request. It also enables diners to split the bill accordingly by selecting individual items that were ordered. Example: Two out of four people at the table are drinking alcohol and the other two aren't. Simply click the itemized list on the touch screen (FIG. 2) to select which items apply (in this case it would be the alcoholic beverages) in order to separate the bill. The device would also be able to split the bill 50/50 if the table prefers. The device would have tip features that calculate tip amounts in specified increments if chosen. Example: 18% or 20%. The Tablebot buttons can be reprogrammed with whatever commands the restaurant deems necessary by following the instructions provided, or contacting a support team for help. The device would have security features implemented through Wi-Fi Password Protected Access and an Encryption Key code to prevent credit card fraud. Every time the server adds something to an order it would be sent directly to the device in real time for the party to view. The device would have a circular message bar located towards the bottom of its base. This message bar can be used for wishing diners a Happy Birthday, Happy New Year, Happy Anniversary, or Merry Christmas etc. Once the dining experience concludes the restaurant can send a personalized "Thank you for dining with us" message through the digital message bar (FIG. 1, 2, 3, 7). The restaurant can also use the message bar for advertising purposes. Tablebot would be updated wirelessly using Wi-Fi for the latest versions. The Tablebot device would be compatible with online reservation websites/apps. It would feature built in CRM (customer relationship management) for customer profiles using their reservation/online accounts. In the case that some diners are more selective of their seating, or have a specific table in mind because it holds special meaning to them (example: a husband proposed to his wife at a certain table and the couple preferred that table when celebrating their anniversary) they would be able to select that table by using Tablebot.

If partnered with an online reservation service the Tablebot device would show the layout of the restaurant and help customers request a specific section of the restaurant based on Tablebots (individual devices) assigned table(s). The party would pick a table the same way he/she would request is put in. Tablebot would assist the wait staff by notifying them in the proper order that requests are made so that tables aren't being overlooked or serviced out of order. Once a request is put in, the top/tip of the device would light up indicating the request.

Simultaneously the smartwatch being worn by the server vibrates or chirps specifying the same request made by the party. Once the server tends to the table he/she deletes the request from the watch, and the light on the device would turn off. So instead of having to get the servers attention to come to the table, the request can instantly be sent to the server's smartwatch to save time. The smartwatch would show the table number and what the request is (FIG. 4). Example 1: A button on the device would be labeled "Repeat Round". Anytime this button is selected the drink order automatically notifies the server and the bartender simultaneously. The button would notify the server that the party would like to refresh their round of drinks and it would also be forwarded to the bartender notifying him/her to make the drinks so they are ready for the server to take to the table, instead of having the server walk over to the table to take the drink order. Example 2: Another button would be labeled "Water". This would notify the server that the party is in need of water so he/she can notify the bus boy to tend to the table instead of having them wander the room aimlessly to see which tables need water. The bus crew would be more efficient clearing tables this way as well. Example 3: Another button would be labeled "Dessert" indicating that the party would like to see the dessert menu, or have the server tell them about the desserts offered. Example 4: Another button would simply be labeled "Attention". This button is to get the servers attention for other requests the diners/patrons may have instead of having to waive him/her down, or wait for the server to come to the table on his/her own. Example 5: Another button would be labeled "Check Request". This would alert the server that the party has requested the check. Once that button is pressed the party has the option to view the check on the Tablebot device screen. The party can then specify on the screen whether they want to pay with credit card or request a paper check. If a paper check is requested, it notifies the server so he/she can print it and bring it to the table. If the party would rather have the server handle the credit card that can also be requested. The pay with credit card feature using the Tablebot device is intended to enable the customer(s) to pay without requesting the server. If a party chooses to pay without the assistance of the server by using a credit card it can be done by following the instructions on the device and inserting a credit card, or cards (one at a time if splitting the bill).

Items can be split up appropriately upon check request. It also enables diners to split the bill accordingly by selecting individual items that were ordered. Example: Two out of four people at the table are drinking alcohol and the other two aren't. Simply click the itemized list on the touch screen (FIG. 2) to select which items apply (in this case it would be the alcoholic beverages) in order to separate the bill. The device would also be able to split the bill 50/50 if the table prefers. The device would have tip features that calculate tip amounts in specified increments if chosen. Example: 18% or 20%. The Tablebot buttons can be reprogrammed with whatever commands the restaurant deems necessary by following the instructions provided, or contacting a support team for help. The device would have security features implemented through Wi-Fi Password Protected Access and an Encryption Key code to prevent credit card fraud. Every time the server adds something to an order it would be sent directly to the device in real time for the party to view. The device would have a circular message bar located towards the bottom of its base. This message bar can be used for wishing diners a Happy Birthday, Happy New Year, Happy Anniversary, or Merry Christmas etc. Once the dining experience concludes the restaurant can send a personalized "Thank you for dining with us" message through the digital message bar (FIG. 1, 2, 3, 7). The restaurant can also use the message bar for advertising purposes. Tablebot would be updated wirelessly using Wi-Fi for the latest versions. The Tablebot device would be compatible with online reservation websites/apps. It would feature built in CRM (customer relationship management) for customer profiles using their reservation/online accounts. In the case that some diners are more selective of their seating, or have a specific table in mind because it holds special meaning to them (example: a husband proposed to his wife at a certain table and the couple preferred that table when celebrating their anniversary) they would be able to select that table by using Tablebot.

Figure 5:
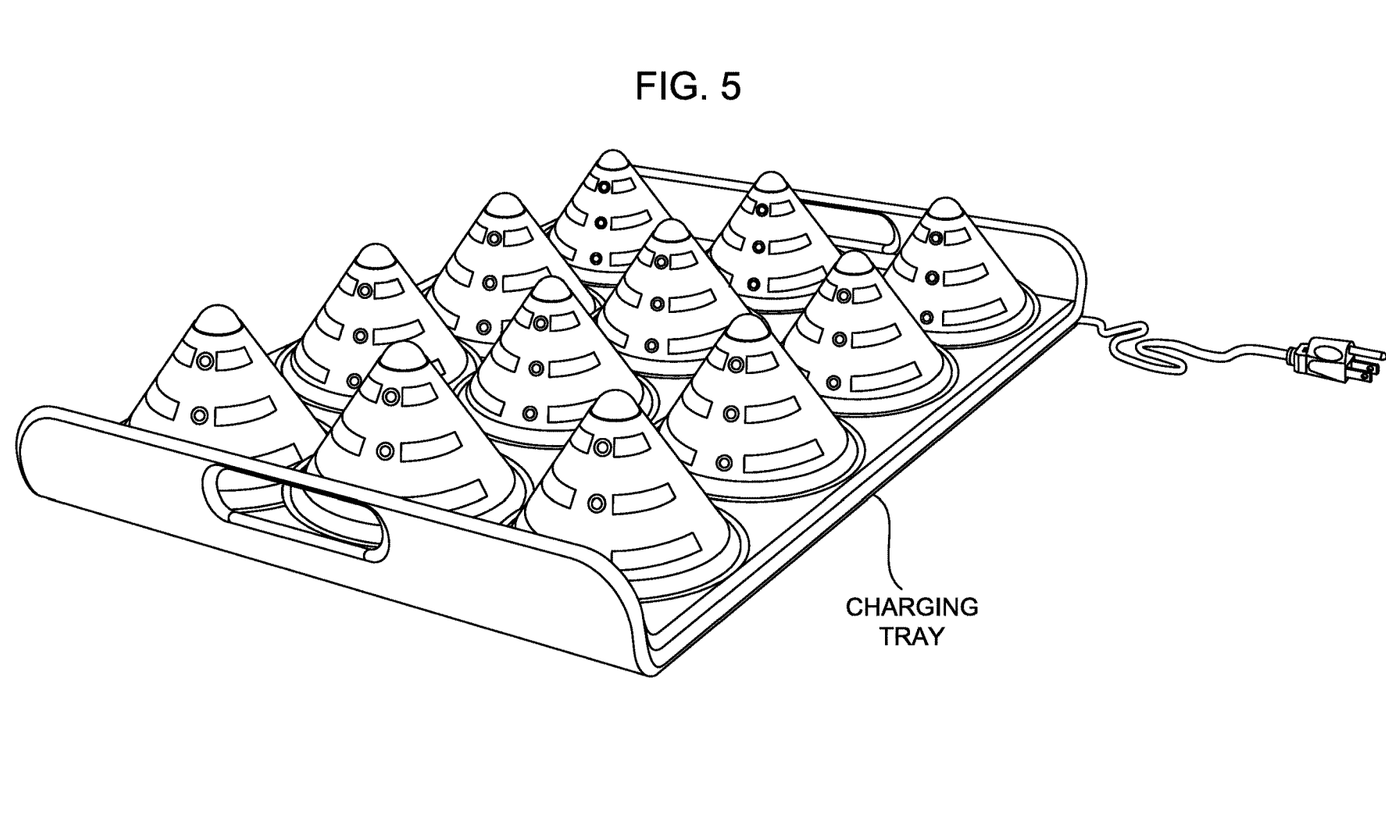
FIG. 5 is the front view of the Tablebot charging tray.
Figure 6:
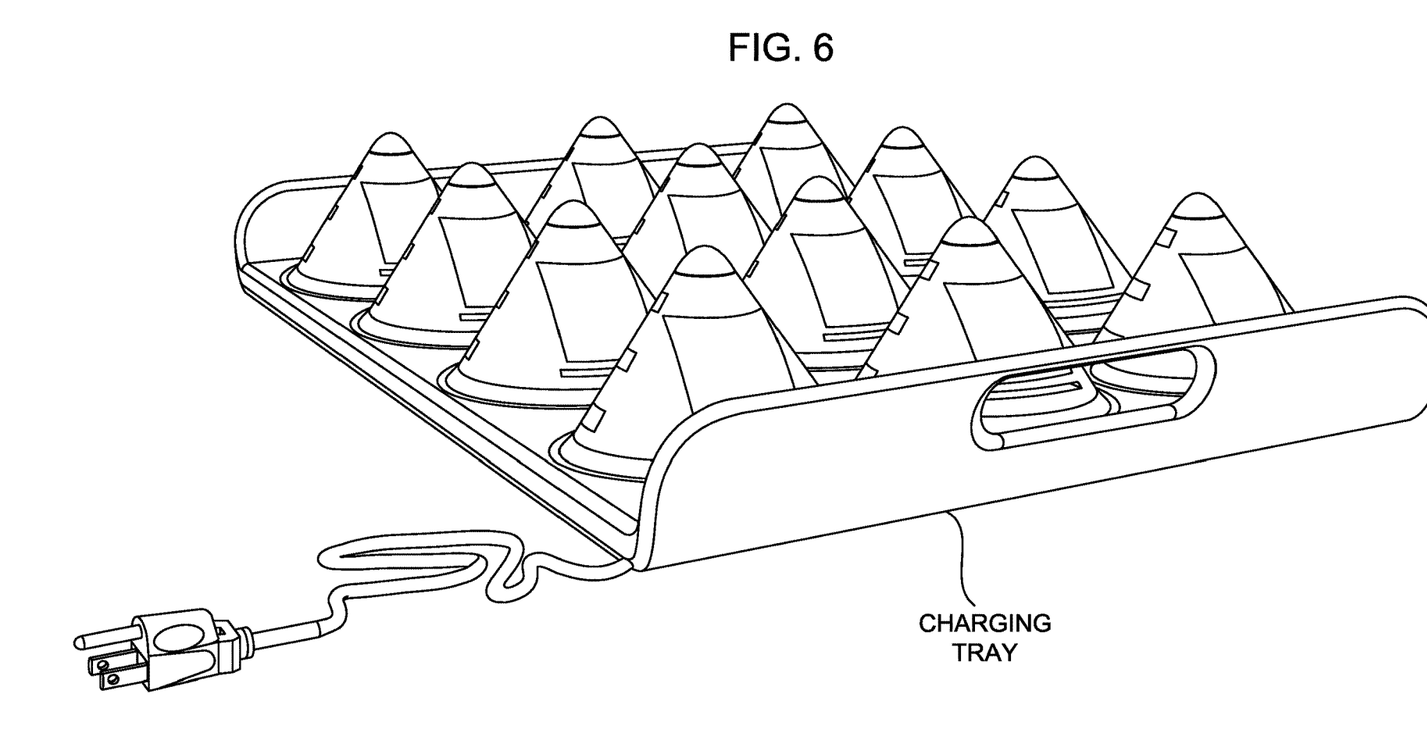
FIG. 6 is the rear view of the Tablebot charging tray.
Figure 7:
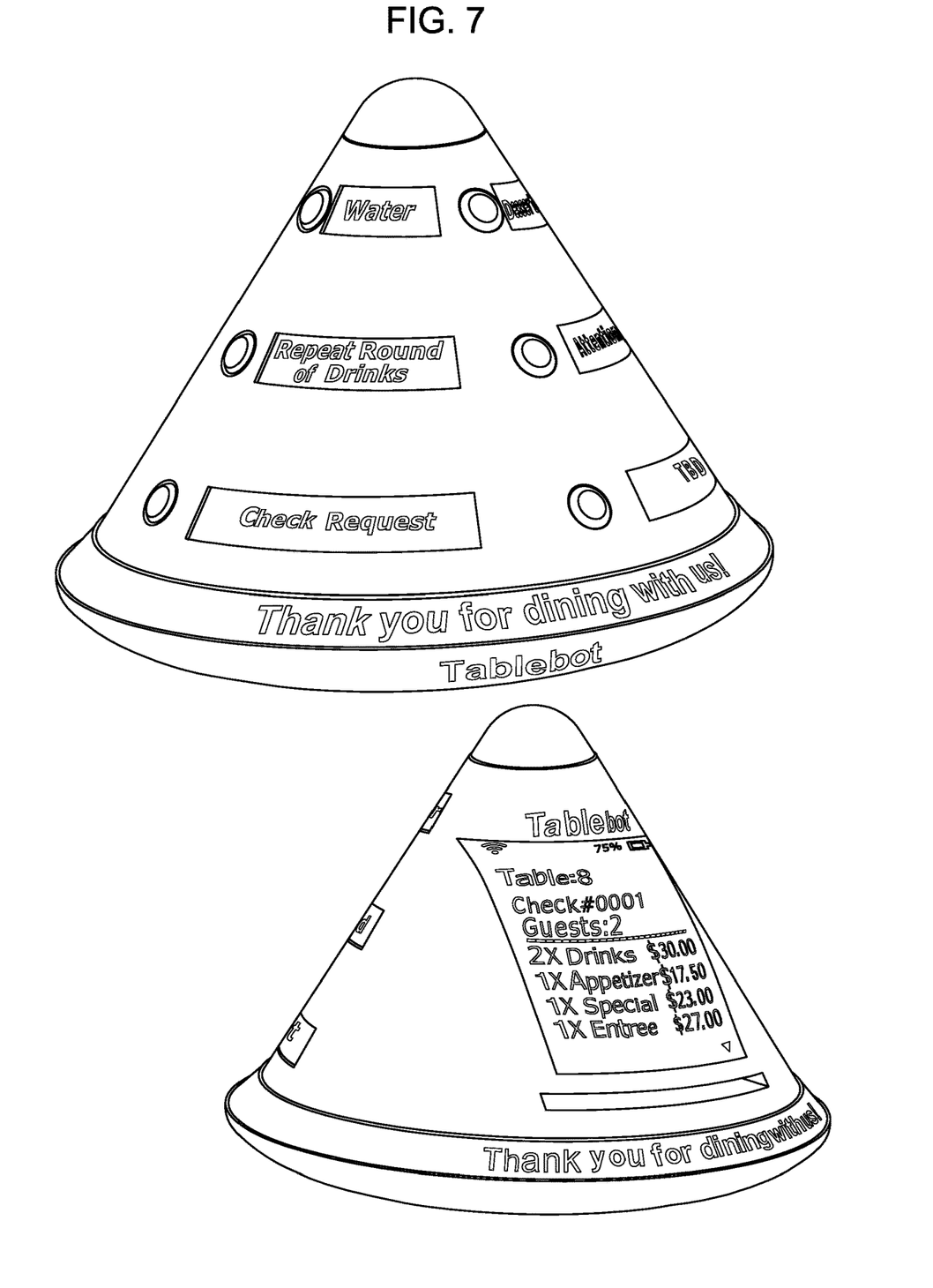
FIG. 7 is the additional angles view of the Tablebot device.

If partnered with an online reservation service the Tablebot device would show the layout of the restaurant and help customers request a specific section of the restaurant based on Tablebots (individual devices) assigned table(s). The party would pick a table the same way he/she would select seats on an airplane using a reservation app. Once tables are selected they would show as "reserved". It would be the restaurants responsibility to do everything they can in order to accommodate the parties seating request. The device would also be waterproof in case there are drinks spilled on it. It would also be shock resistant so that it can withstand being dropped from a reasonable table height in order to avoid breakage. When the Tablebot devices run out of battery they would be placed on a specially designed charging tray (similar in function to the Samsung fast charge wireless charge pad) to recharge. The charging tray would be designed to charge multiple devices at the same time (FIG. 5, 6). The Tablebot battery indicator would be located in the upper right hand corner of the device screen just like a cell phone (FIG. 2). Each restaurant will be supplied however many charging trays are required in order to charge all Tablebot devices simultaneously. Ultimately the purpose of the Tablebot device with smartwatch is to improve communication between diners and servers for a more enjoyable dining experience.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. An apparatus for communicating between diners and servers, comprising:
    a housing, said housing having a base, an uppermost surface, and an external surface extending vertically from said base towards said uppermost surface, wherein said base is configured for removable placement on a dining surface;
    a touchscreen display mounted to said housing, said touchscreen display vertically extending between said base and said uppermost surface,
    a Wi-Fi device positioned within said housing,
    a plurality of selectable buttons adjacent the external surface of the housing and separated from said touchscreen display, wherein said plurality of selectable buttons includes at least one service request button configured to transmit, upon selection, a service request message to a remote device,
    a light positioned near the uppermost surface of the housing, wherein said light is activated in response to selection of said service request button, and wherein said light is configured to deactivate in response to a signal from said remote device,
    a digital message bar positioned near the base of the housing, wherein said digital message bar is spaced apart from said touchscreen display,
    a slot in the housing configured to receive a credit card, and
    a rechargeable battery positioned with said housing.

2. The apparatus of claim 1 wherein said housing base is wider than said uppermost surface and said housing has a conical shape.

3. The apparatus of claim 1 wherein said housing is waterproof.

4. The apparatus of claim 1 wherein said plurality of selectable buttons includes at least one check request button configured to display, upon selection, a diner's check on said touchscreen display.

5. The apparatus of claim 4 wherein said touchscreen display displays a table number, a check number, and diner order information.

6. The apparatus of claim 5 wherein said service request message includes table number information and a time information.

7. The apparatus of claim 2 wherein said message bar extends substantially around the circumference of the base of said housing and wherein said message bar displays a message to a diner.

8. The apparatus of claim 7 wherein said message bar further displays an advertisement.

* * * * *